Nov. 10, 1964    H. C. HAWGOOD    3,156,315
DOLLIES FOR MANEUVERING TRAILERS
Filed June 5, 1962    2 Sheets-Sheet 1

INVENTOR.
HAROLD C. HAWGOOD
BY
LeRoy J. Leishman
AGENT

Nov. 10, 1964    H. C. HAWGOOD    3,156,315
DOLLIES FOR MANEUVERING TRAILERS
Filed June 5, 1962    2 Sheets-Sheet 2
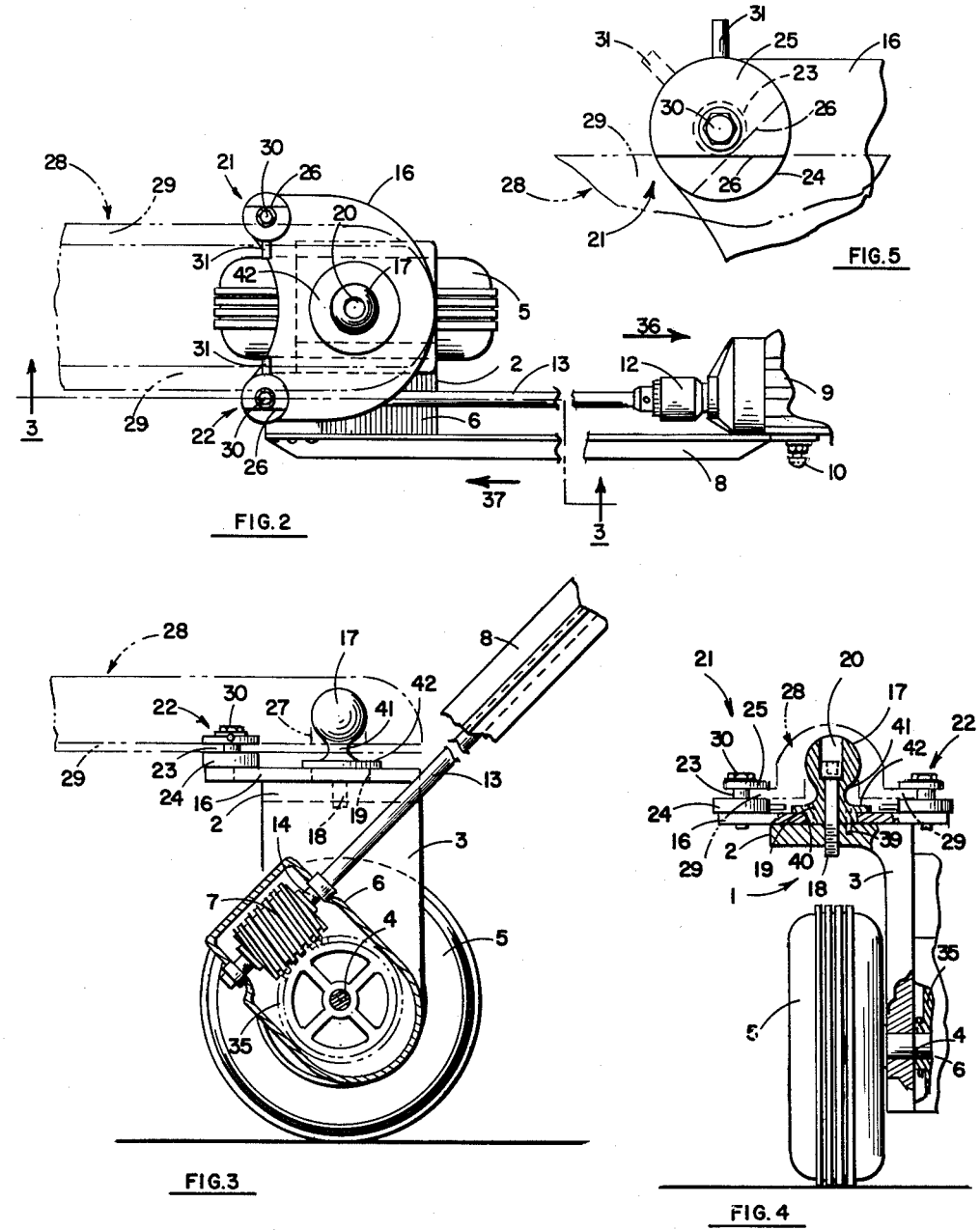
INVENTOR.
HAROLD C. HAWGOOD
BY
LeRoy J. Leishman
AGENT

3,156,315
DOLLIES FOR MANEUVERING TRAILERS
Harold C. Hawgood, 5737 Craner Ave.,
North Hollywood, Calif.
Filed June 5, 1962, Ser. No. 200,248
9 Claims. (Cl. 180—13)

The invention herein described pertains to dollies, and more particularly to a power-driven type thereof for maneuvering trailers and the like for parking purposes.

When a trailer has been detached from the towing vehicle, it is awkward and sometimes difficult to maneuver. One object of the present invention is to provide a dolly that will make it easy to maneuver and park a trailer.

Power-driven dollies have heretofore been bulky and expensive, and it is accordingly an object of the present invention to provide a dolly that is simple in construction and therefore inexpensive.

In the past, power-driven dollies have required a cumbersome motor, and if an electric motor has been used the structure has been bulky.

Another object of the present invention is to overcome these defects by providing a dolly that will use the regular house current, if readily available, and operate by means of a detachable power-drill, which may thus serve a dual purpose.

Another object is to provide a design that will employ the regular handle of the drill as the handle for guiding the dolly.

A further object of the present invention is to provide a dolly of the type described requiring only one supporting wheel.

An additional object is to provide a power-driven dolly of the type described in which there can be a direct drive from the chuck of the power drill to the worm of a worm and worm gear speed reducing mechanism in order further to simplify the overall structure of the device.

Yet another object is to provide simple means for attaching the dolly to the hitch that is usually connected as an extension to the trailer for connecting it to the towing vehicle.

Still other objects will appear as the specification proceeds.

In the drawings:

FIG. 2 is a top view, with a section removed, to show the general arrangement of the principal components.

FIG. 3 is a section taken along line 3—3 of FIG. 2.

FIG. 4 is a broken-away left side view of the parts shown in FIG. 3.

FIG. 5 is an enlarged view of one of the clamping devices for attaching my dolly to the trailer hitch, showing its manner of operation.

Figure 1:
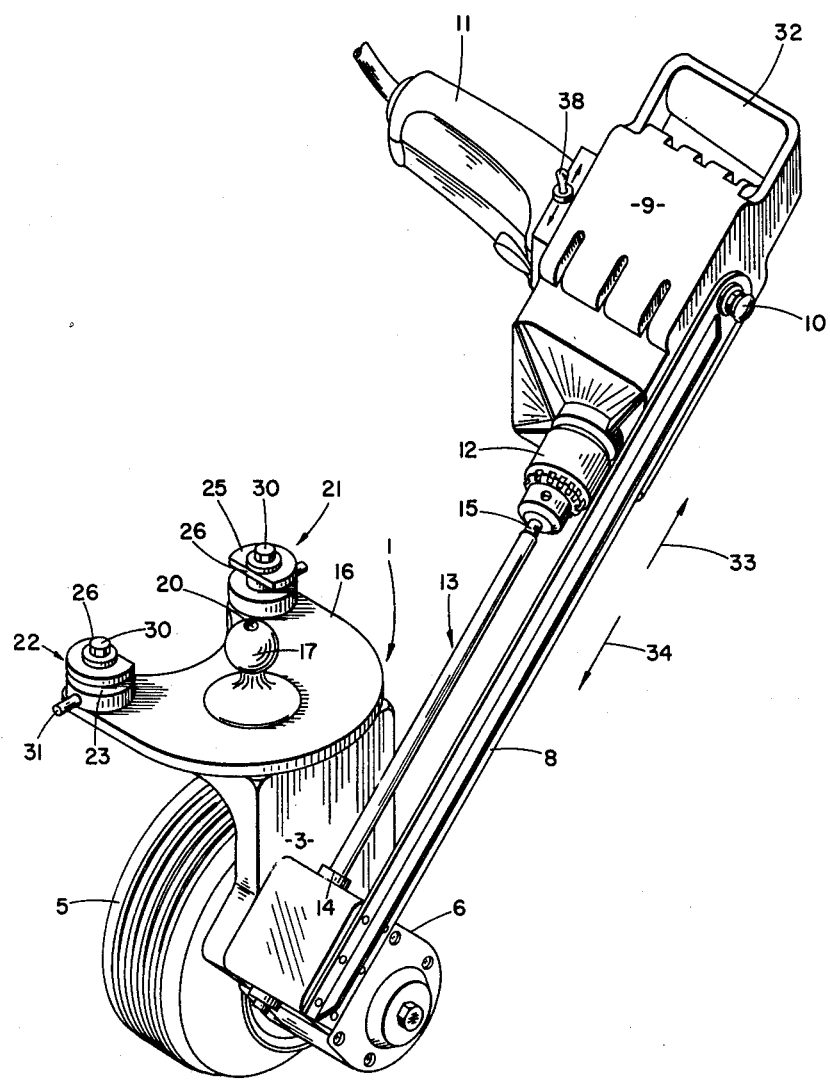
FIG. 1 is a general isometric view of my dolly including the detachable power drill which is its only source of power.

My device is supported and built around an L-shaped bracket 1 having a horizontal section or branch 2 and a vertical arm or branch 3 at right angles thereto. A shaft 4 is appropriately journaled in, or by means of structure mounted on, the vertical branch 3. The shaft 4, extending through the arm or branch 3 at right angles thereto, is consequently parallel to the general plane of the horizontal branch 2. A supporting wheel 5, which may comprise a pneumatic rubber tire, is mounted rigidly to one end of the shaft 4, and a worm gear 35 is rigidly attached to the other end of the shaft with the vertical branch 3 of the bracket 1 interposed between the supporting wheel 5 and the worm gear 35.

I prefer that the worm gear 35 be encased in a gear box 6 which may be attached to, or formed integrally with, the vertical branch 3 of the bracket 2. A worm 7 is appropriately mounted in the gear box to mesh with the worm gear 5. An elongated member or rod 8 is rigidly supported with respect to the vertical branch 3, either by direct attachment thereto or by means of the intervening gear box 6, as best shown in FIG. 1.

I presently prefer to form the rod or arm 8 from an extrusion of T-shaped configuration to provide rigidity.

As mentioned in the foregoing objects, I contemplate the use of a standard electrically powered hand drill to provide the motive power for operating my dolly, this arrangement with the associated structure providing adequate power and making possible an inexpensive combination. I detachably mount the power-driven hand drill 9 to the rod or extrusion 8 by means of a single bolt 10 which holds the side of the drill that is most remote from its butt handle 11 firmly against one side of the rod 8. Inasmuch as there is no appreciable force tending to turn the drill from its mounted position, the one screw mounting is adequate, particularly since the screw provides an axis around which the drill with its associated chuck 12 may turn in order to align the chuck with the shaft 13. End 14 of this shaft is appropriately connected to the worm 7 for transmitting the power of the motor to the worm. I prefer to mount the worm 7 directly upon end 14 of the shaft 13 as shown in FIG. 3, although this direct connection is of course not essential.

Couplers of any suitable type may of course be interposed between the worm 7 and the driveshaft 13.

The end of shaft 13 that is remote from the worm 7 is reduced at 15 for easy insertion into the chuck 15 at the time of mounting the power drill. I prefer that the greater part of shaft 13 be of larger diameter than the drills which may usually be inserted in the chucks of hand drills that are most commonly in use. This arrangement provides a more sturdy drive shaft than would be the case if the shaft had the same diameter throughout as does the reduced end 15.

A plate 16, serving the same general purpose as the so-called "fifth wheel" used for connecting towing vehicles to trailing vehicles, is pivotally attached to the horizontal branch 2 of the bracket 1. The plate 16 has an opening 40 therein to rotatably receive the boss 19 integrally formed on the structure 41 just below the flared portion 42. The length of this boss is slightly greater than the thickness of plate 16. A dowel pin 39, tightly pressed into the boss 19, extends downwardly therefrom. The structure 41 comprises a ball 17 on its upper end for purposes soon to be described.

The horizontal branch 2 has a hole extending downwardly from its top surface to receive the dowel pin 39. A bolt 18, preferably having an Allen head, passes vertically through a counterbored hole 20 in the structure 41, and it is then threaded into the horizontal branch 2. When this bolt is tightened, the dowel pin prevents any tendency of the structure 41 to turn with respect to the horizontal branch 2. The plate 16 then rotates freely around the boss 19. The upper end of bolt 18 is accessible to an appropriate wrench through the hole 20 extending centrally through the ball.

My dolly assembly comprises two clamping means 21 and 22 for firmly connecting the dolly to the hitch of a trailer. These clamping devices 21 and 22 each comprise a peripherally grooved, spool-like member with a portion of one of the flanges removed. A groove 23 consequently extends all the way around each of these members between the lower flange 24 and the upper flange 25, a portion of which is cut away to form a straight side 26 as best illustrated in FIGS. 1 and 5. The usual hitch 28, shown in broken lines in FIG. 3, is generally provided with a socket 27, adapted to receive the ball 17 therein, as shown in FIG. 3. When the socket 27 of the hitch 28 is to be slipped over the ball 17, the bolts 30, which pass through clearance holes in members 21 and 22 and are threaded into plate 16, are loosened in order to permit the rotation of these members to the angular positions illustrated in FIG. 1 and in full lines in FIG. 5. This results in the provision of enough space between the flat sides 26 of members 21 and 22 to clear the flange 29 that extends along opposite sides of the hitch. The socket 27 may then readily be placed over the ball 17 with the flanges 29 of the hitch resting on the continuous annular flanges 24 of members 21 and 22.

When the hitch has thus been placed in position, the clamping members 21 and 22 are rotated by means of the short handles or pins 31, as indicated in FIG. 5, where this pin and member 21 are shown in broken lines in a transitional position with a portion of the straight side 26 of the upper flange already overlapping a portion of the flange 29 on the hitch. These members must be turned to the angular positions indicated in FIGS. 2 and 4, in which the curved sides of the upper flanges 25 are shown extending over the flanges 29 of the hitch. The bolts 30 may then be tightened to clamp the flanges firmly in position, thus holding the socket 27 over the ball 17.

When the dolly has been connected to the hitch in the manner just described, it will be clear that my entire dolly may rotate around the bolt 18 as an axis. This axis, as will be clear from an examination of FIG. 4, passes between the opposite sides of the supporting wheel 5, which is disposed beneath the overhanging horizontal branch No. 2 of the main bracket 1 that forms the center supporting structure of my dolly.

When the bar or extrusion 8 is connected as shown with its opposite ends connected respectively to the gear box 6 and the motor 9, the shaft 13 should be parallel with member 8. This means that the axis around which shaft 13 rotates must be the same distance from member 8 at both ends of the shaft 13. The dimensions of the gear box must therefore be selected accordingly.

It will be clear from the figures that the entire dolly may readily be rotated around the ball 17 by means of the main handle 32 or the butt handle 11, the handle 32, of course, providing the logical means for guiding and rotating the dolly. Such a handle may of course be provided on an extension of member 8 if the power drill does not have an appropriate handle in this position. When the dolly is disposed as shown in FIG. 1, it will be clear that the rotation of wheel 5 in one direction will cause the entire structure to move in the direction of arrow 33, and that the rotation of wheel 5 in the opposition direction will cause the dolly to move in the direction of arrow 34. If the dolly happens to be turned to the position indicated in FIG. 2, where the rod 8 is parallel to the hitch 28, the same clockwise rotation of wheel 5 that causes the dolly to move in the direction of arrow 33 in FIG. 1 will cause the dolly and the attached trailer to move in the direction of arrow 36 in FIG. 2. Counterclockwise rotation that produces movement in the direction of arrow 34 when the parts are disposed as shown in FIG. 1, will move the dolly and trailer in the direction of arrow 37 in FIG. 2 if the dolly and trailer are longitudinally aligned as shown in FIG. 2. In order to provide the necessary rotation in either direction, the hand drill required for my dolly must of course incorporate appropriate circuits and a suitable switch 38 for reversing the direction of rotation.

The structure hereinbefore described and shown in the drawings may of course be used to move the attached trailer forward or backwards, or to move the hitch sideways in either direction for maneuvering the trailer into any desired position or location.

Various modifications, additions, transpositions and substitutions may of course be made in the structure of my dolly and in its component elements without departing from the broad spirit of my invention as set forth in the appended claims.

My claims are:

1. A dolly for maneuvering trailers and the like, said dolly comprising: a bracket having a horizontal branch and a vertical branch depending from said horizontal branch; means carried by the horizontal branch for so removably attaching the bracket to the hitch of a trailer that the bracket may rotate on a vertical axis; a first shaft extending through said vertical branch and journaled therein for rotation on a horizontal axis; a supporting wheel rigidly mounted on said first shaft and so positioned thereon that said vertical axis will pass between the wheel's opposite sides; a worm gear rigidly mounted on said first shaft and so positioned thereon that said vertical branch is interposed between said wheel and said gear; a bar for steering the dolly, said bar rigidly mounted with respect to said vertical branch and extending perpendicularly of said first shaft; a second shaft disposed parallel to said bar and having one end disposed in the vicinity of said worm gear; a worm meshing with said worm gear and mounted for rotation with said second shaft; and means for mounting a chuck-carrying power drill adjacent the free end of said bar with its chuck in position to receive the otherwise free end of said second shaft.

2. A dolly for maneuvering trailers and the like, said dolly comprising: a bracket having a horizontal branch and a vertical branch depending from said horizontal branch; means carried by the horizontal branch for so removably attaching said bracket to the hitch of a trailer that the bracket may rotate on a vertical axis, said means comprising a plate rotatably mounted on said horizontal branch and a pair of clamping devices attached to said plate and so disposed thereon that they may grip opposite sides of said hitch; a first shaft extending through said vertical branch and journaled therein for rotation on a horizontal axis; a supporting wheel rigidly mounted on said first shaft and so positioned thereon that said vertical axis will pass between the wheel's opposite sides; a worm gear rigidly mounted on said first shaft and so positioned thereon that said vertical branch is interposed between said wheel and said gear; a bar rigidly mounted with respect to said vertical branch and extending perpendicularly of said first shaft; a second shaft disposed parallel to said bar and having one end disposed in the vicinity of said worm gear; a worm meshing with said worm gear and mounted for rotation with said second shaft; and means for mounting a chuck-carrying power drill adjacent the free end of said bar with its chuck in position to receive the otherwise free end of said second shaft.

3. A dolly for maneuvering trailers and the like, said dolly comprising: a bracket having a horizontal branch and a vertical branch depending from said horizontal branch; means carried by the horizontal branch for so removably attaching the bracket to the hitch of a trailer that the bracket may rotate on a vertical axis; a first shaft extending through said vertical branch and journaled therein for rotation on a horizontal axis; a supporting wheel rigidly mounted on said first shaft beneath said horizontal branch; a worm gear rigidly mounted on said first shaft and so positioned thereon that said vertical branch is interposed between said wheel and said gear; a bar for steering the dolly, said bar rigidly mounted with respect to said bracket and extending perpendicularly of said first shaft; a second shaft disposed parallel to said bar and having one end disposed in the vicinity of said worm gear; a worm meshing wtih said worm gear and mounted for rotation with said second shaft; and means for mounting a chuck-carrying power drill adjacent the free end of said bar with its chuck in position to receive the otherwise free end of said second shaft.

4. A dolly for maneuvering trailers and the like, said dolly comprising: a bracket having a horizontal branch and a vertical branch depending from said horizontal branch; means carried by the horizontal branch for so removably attaching the bracket to the hitch of a trailer that the bracket may rotate on a vertical axis; a first shaft extending through said vertical branch and journaled therein for rotation on a horizontal axis; a supporting wheel rigidly mounted on said first shaft and so positioned thereon that said vertical axis will pass substantially midway between the wheel's opposite sides; a worm gear rigidly mounted on said first shaft and so positioned thereon that said vertical branch is interposed between said wheel and said gear; a bar having a connection to said vertical branch and extending perpendicularly of said first shaft; a handle fixed in position with respect to said bar for guiding said dolly; a second shaft disposed parallel to said bar and having one end disposed in the vicinity of said worm gear; a worm meshing with said worm gear and mounted for rotation with said second shaft; and means for mounting a chuck-carrying power drill adjacent the free end of said bar with its chuck in position to receive the otherwise free end of said second shaft.

5. A dolly for maneuvering trailers and the like, said dolly comprising: a bracket having a horizontal branch and a vertical branch depending from said horizontal branch; means carried by the horizontal branch for so removably attaching the bracket to the hitch of a trailer that the bracket may rotate on a vertical axis; a first shaft extending through said vertical branch and journaled therein for rotation on a horizontal axis; a supporting wheel rigidly mounted on said first shaft and so positioned thereon that said vertical axis will pass between the wheel's opposite sides; a worm gear rigidly mounted on said first shaft and so positioned thereon that said vertical branch is interposed between said wheel and said gear; a bar having a connection to said vertical branch and extending perpendicularly of said first shaft; a handle fixed in position with respect to said bar for guiding said dolly; a second shaft disposed parallel to said bar and having one end disposed in the vicinity of said worm gear; a worm meshing with said worm gear and mounted for rotation with said second shaft; means for mounting a chuck-carrying electric power drill adjacent the free end of said bar with its chuck in position to receive the otherwise free end of said second shaft; and a reversing switch connected into the electric circuits of said electric power drill.

6. A dolly for maneuvering trailers and the like, said dolly comprising: a bracket having a horizontal branch and a vertical branch depending from said horizontal branch; means carried by the horizontal branch for so removably attaching the bracket to the hitch of a trailer that the bracket may rotate on a vertical axis; a first shaft extending through said vertical branch and journaled therein for rotation on a horizontal axis; a supporting wheel rigidly mounted on said first shaft beneath said horizontal branch; a worm gear rigidly mounted on said first shaft and so positioned thereon that said vertical branch is interposed between said wheel and said gear; a bar for steering the dolly, said bar having a connection to said vertical branch and extending perpendicularly of said first shaft; a second shaft disposed parallel to said bar and having one end disposed in the vicinity of said worm gear; a worm meshing with said worm gear and mounted for rotation with said second shaft; and a chuck-carrying electric power drill mounted on said bar near its free end with its chuck in position to receive the otherwise free end of said second shaft, said electric power drill comprising a reversing switch.

7. A dolly for maneuvering trailers and the like, said dolly comprising: a bracket having a horizontal branch and a vertical branch; means carried by the horizontal branch for so removably attaching the bracket to the hitch of a trailer that the bracket may rotate on a vertical axis; a first shaft extending through said vertical branch for rotation on a horizontal axis; a gear box mounted on said vertical branch with said first shaft extending therethrough, said gear box having a worm and worm gear therein, said worm gear mounted on said first shaft for rotation therewith, and said worm meshing with said worm gear; a supporting wheel rigidly mounted on said first shaft beneath said horizontal branch; a bar for steering the dolly, said bar fixed in position with respect to said vertical branch and extending therefrom perpendicularly of said first shaft; a second shaft disposed parallel to said bar and having one end at least operatively connected to said worm for rotation therewith; and means for mounting a chuck-carrying power drill adjacent the free end of said bar with its chuck in position to receive the otherwise free end of said second shaft.

8. A dolly for maneuvering trailers and the like, said dolly comprising: a bracket having a horizontal branch and a vertical branch; means carried by the horizontal branch for so removably attaching the bracket to the hitch of a trailer that the bracket may rotate on a vertical axis; a first shaft extending through said vertical branch for rotation on a horizontal axis; a gear box mounted on said vertical branch with said first shaft extending therethrough, said gear box having a worm and worm gear therein, said worm gear mounted on said first shaft for rotation therewith, and said worm meshing with said worm gear; a supporting wheel rigidly mounted on said first shaft beneath said horizontal branch; a bar attached to said gear box and extending therefrom at a right angle to said first shaft; a second shaft paralleling said bar and having one end at least operatively connected to said worm for rotation therewith; and a power drill having an integral operating and positioning handle, said drill so mounted on said bar that its chuck may receive and grip the otherwise free end of said second shaft and so that its handle may be used to steer the dolly.

9. A dolly for maneuvering trailers and the like, said dolly comprising a bracket having a horizontal branch and a vertical branch depending from said horizontal branch; a shaft passing through said vertical branch and journalled therein; a supporting wheel rigidly mounted on said shaft; a bar extending from said bracket and having one end attached thereto for guiding said dolly; a plate superposed over said horizontal branch and rotatably connected thereto; means carried by said plate for connecting it to a trailer hitch having a horizontally disposed peripheral flange and a first matable portion of a male-and-female connector; said means comprising a second matable portion of a male-and-female connector that is complementary to said first portion whereby the said portions may be joined in mating engagement; and a pair of devices affixed to said plate at spaced locations thereon for releasably straddling and clamping opposite sides of said peripheral flange to hold said portions of said connector in their connected positions.

References Cited by the Examiner
UNITED STATES PATENTS

| | | | |
|---|---|---|---|
| 1,833,844 | 11/31 | Lusse | 180—26 |
| 2,491,824 | 12/49 | McKee | 180—11 X |
| 2,706,008 | 4/55 | Voigt | 180—26 X |
| 2,730,320 | 1/56 | Srader | 280—47.24 X |

A. HARRY LEVY, *Primary Examiner.*